United States Patent [19]

Croslin

[11] Patent Number: 5,995,485
[45] Date of Patent: Nov. 30, 1999

US005995485A

[54] METHOD AND APPARATUS FOR ISOLATING NETWORK FAILURES BY CORRELATING PATHS ISSUING ALARMS WITH FAILURE SPANS

[75] Inventor: William D. Croslin, Colorado Springs, Colo.

[73] Assignee: MCI Communications Corporation, Washington, D.C.

[21] Appl. No.: 08/753,560

[22] Filed: Nov. 26, 1996

[51] Int. Cl.[6] .................................................... H04J 1/16
[52] U.S. Cl. .......................................................... 370/216
[58] Field of Search .................................. 370/216, 389, 370/222, 223, 224, 225, 227, 228, 252, 251, 351, 256, 255, 254, 360, 400, 406, 407, 408, 409, 468; 340/825.03, 827; 395/181, 181.01; 379/221

[56] References Cited

U.S. PATENT DOCUMENTS

| | | | |
|---|---|---|---|
| 4,577,066 | 3/1986 | Bimonte et al. | 179/18 |
| 4,920,529 | 4/1990 | Sasaki et al. | 370/16 |
| 5,187,740 | 2/1993 | Swaim et al. | 379/209 |
| 5,335,268 | 8/1994 | Kelly, Jr. et al. | 379/112 |
| 5,459,716 | 10/1995 | Fahim et al. | 370/16 |
| 5,463,615 | 10/1995 | Steinhorn | 340/827 |
| 5,636,203 | 6/1997 | Shah | 370/244 |
| 5,646,936 | 7/1997 | Shah et al. | 370/228 |
| 5,680,546 | 10/1997 | Chiaretti et al. | 370/216 |
| 5,706,276 | 1/1998 | Arslan et al. | 370/216 |

FOREIGN PATENT DOCUMENTS

| | | |
|---|---|---|
| 0 494 513 A2 | 12/1991 | European Pat. Off. . |
| WO 95/10149 | 4/1995 | European Pat. Off. . |

OTHER PUBLICATIONS

U.S Application No. 08/910,912, Distributed Method And System For Excluding Components From A Restoral Route In A Communications Network, Aug. 13, 1997.

U.S Application No. 08/910,697, Method for Initiating A Distributed Restoration Process, Aug. 13, 1997.

U.S Application No. 08/910,911, Centralized Method And System For Excluding Components From A Restoral Route In A Communications Network, Aug. 13, 1997.

U.S Application No. 08/938,671, System And Method For Emulating Network Outages Using A Segmented Architecture.

U.S Application No. 08/777,877, "Method And Apparatus For Creating Preferred Routes For Network Restoration", Dec. 31, 1996.

U.S Application No. 08/775,220, Centralized Restoration Of Network Using Preferred Routing Tables To Dynamically Build An Available Preferred Restoral Route, Dec. 31, 1996.

U.S Application No. 08/775,222, Method And Apparatus For Automated Node–Based Normalization After Network Restoration, Dec. 31, 1996.

(List continued on next page.)

*Primary Examiner*—Dang Ton

[57] ABSTRACT

A method and apparatus for analyzing a telecommunications network and isolating failures within the network first analyzes the network to identify all non-terminating paths between two digital cross-connect (DXC) nodes and terminating paths that extend from one DXC node but terminate before reaching another DXC node. All non-terminating paths are assigned "failure spans" or maximum spans that can be restored with a single restoration route. All terminating paths that correspond to end nodes of the non-terminating path are selected, where each terminating path has a path identifier preferably indicating the inter-node connections of the path. The path identifier is compared to each failure span to create a table of correlations. A similar process is performed for all terminating paths that do not correspond to non-terminating paths in the network. When a failure occurs, all paths are identified for each corresponding alarm and compared to the previously constructed table. A failure span is identified as including a failure if one or more paths are on the failure span and are in alarm, and all paths which are off the failure span are not in alarm. Furthermore, the ports on each path in alarm can be collected to determine whether the network suffers from a full or a partial outage.

32 Claims, 7 Drawing Sheets

OTHER PUBLICATIONS

U.S Application No. 08/775,221, "Integration Of A Centralized Network Restoration System With A Distributed Network Restoration System", Dec 31, 1996.

U.S Application No. 08/885,712, Method And System For Assigning Spare Transmission Links To Restoral Routes, Jun. 30, 1997.

U.S Application No. 08/884,710, Method And System For Pre–Patching A Comunications Network, Jun. 30, 1997.

U.S Application No. 08/884,716, Method And System For Augmenting A Communication Network With Spare Capacity, Jun. 30, 1997.

U.S Application No. 08/904,095, Dynamic route Generator, Jul. 31, 1997.

U.S Application No. 08/701,514, Enhanced Voice Services Load Balancing, Aug. 22, 1996.

U.S Application No. 08/758,111, "Method And Apparatus For Determining Maximum Network Failure Spans For Restoration", Nov. 25, 1996.

U.S Applications No. 08/753,558, "Method And Apparatus For Deriving And Representing Physical Network Topology", Nov. 26, 1996.

U.S Application No. 08/753,559, Method And Apparatus For Isolating Network Failures By Applying Alarms To Failure Spans, Nov. 26, 1996.

U.S Application No. 08/753,553, "Method And Apparatus For Identifying Restoral Routes In a Network", Nov. 26, 1996.

U.S Application No. 08/774,599, "Method And System of Distributed Network Restoration Using Preferred Routes", Dec. 30, 1996.

U.S Application No. 08/774,437, Method And System of Distributed Network With Multiple Failures, Dec. 30, 1996.

U.S. Application No. 08/77,416, "Method and System for Selecting Preferred Nodes for Distributed Network Restoration", Dec. 30, 1996.

U.S Application No. 08/493,741, System and Method for ReConfiguring A Telecommunications Network to its Normal State After Repair of Fautt, filed Jun. 25, 1995.

U.S application number 08/632,198, "Minimum Common Span Network Outrage Detection And Isolation", filed Apr. 15, 1996.

U.S Applicaton number 08/632,200, "Dynamic Network Topology Determination", filed Apr. 15, 1996.

U.S Application No. 08/669,259, Topology–Based Fault Analysis In Telecommunications Network, Jun. 21, 1996.

U.S Application No. 08/670,872, Segment Substitution/ Swap For Network Restoration Pre–plans, Jun. 26, 1996.

U.S Application No. 08/673,415, "Realtime Restoration Process", Jun. 26, 1996.

Manione et al. "An Inconsistencies Tolerant Approach in the Fault Diagnosis of Telecommunications Networks" Feb. 14, 1994.

Bouloutas, et al. "Alarm Correlation and Fault Identification in Communication Networks" Feb. 1, 1994.

Herzberg et al. "The Hop–Limit Approach for Spare–Capacity Assignment in Survivable Networks" IEEE Dec. 3, 1995.

Dighe, et al. "A Link Based Alternative Routing Scheme for Network Restoration under Failure" IEEE May 1995.

Grover et al. "Near Optimal Spare Capacity Planning in a Mesh Restorable Network" IEEE Jan. 1991.

Hasegawa et al. "Dynamic Reconfiguration of Digital Cross–Connect Systems with Network Control and Management" IEEE.

Bellary, et al. "Intelligent Transport Network Survivability: Study of Distributed and Centralized Control Techniques" IEEE 1990.

Shimazaki et al. "Neopilot: An Integrated ISDN Fault Management System" IEEE Feb. 1990.

Shimazaki et al. "Network Fault Management" Sep. 1992.

Newport, et al. "Network Survivability Through Connectivity Optimization" IEEE 1987.

Flanagan et al. "Principles and Technologies for Planning Survivability–A Metropolitan Case Study", IEEE 1989.

M. Wehr "Protection of Synchronous Transmission networks", Commutation and Transmission, No. 4, 1993.

Coan, et al. "Using Distributed Topology Update and Pre–planned Configurtaions to Achieve Trunk Network Survivability" IEEE Oct. 1991.

METHOD AND APPARATUS FOR ISOLATING NETWORK FAILURES BY CORRELATING PATHS ISSUING ALARMS WITH FAILURE SPANS

TECHNICAL FIELD

The present invention relates to restoring communication systems after a network suffers from an unplanned outage or break in a signal path.

BACKGROUND OF THE INVENTION

In the telecommunications field, particularly in long distance networks, long distance network providers continually strive to increase the traffic carrying capability of their transmission medium. For example, since fiber optic cables have increased bandwidth over known twisted pair or copper wire cables, fiber optic cables are used increasingly for connecting network stations and other network elements. As a result, a greater number of stations or network elements can be connected over a fewer number of fiber optic cables, as opposed to prior cables. In other words, each fiber optic cable can handle numerous trunks, as opposed to prior cables.

Unfortunately, if one or more of the fiber optic cables fail, massive disruption of services to a large number of network customers and users can result. Network service providers or telecommunications carriers therefore strive to quickly and economically restore traffic affected by these disruptions or "outages." Restoring network outages generally requires four steps: (1) detecting the network failure, (2) isolating the location of the failure in the network, (3) determining a traffic restoral route, and (4) implementing the restoral route. Network restoration must be executed quickly to ensure minimal interruption of network traffic. Therefore, nearly all telecommunications carriers wish to restore traffic within a few seconds or less. The telecommunications carriers typically restore the highest priority network elements first, and as many of such elements as possible within a short period of time.

Currently, telecommunications carriers simulate possible failures and determine restoral routes to develop a "pre-plan" by collecting large amounts of data reflecting the logical topology of the network. The collected data is often retrieved from network engineering databases which reflect the logical construction of the network, such as indicating the connections and paths of all network traffic trunks. An engineer or network analyst analyses the collected data, compares the collected data to the geographic or physical layout location of the network, and then generates the pre-plans therefrom. Since the pre-plans are developed prior to any failure in the network, when a failure does occur, a plan already exists for restoring traffic affected by the failure. In general, a pre-plan corresponds to a segment of the network that can incur a failure. If that segment fails, then the corresponding pre-plan is retrieved, and its restoral route implemented.

To determine where in the network a failure has occurred, a central location often receives various alarms from the network, which are generated in response to the failure. Numerous algorithms are implemented by a central computer to apply or correlate the various alarms to each corresponding trunk in the trunk topology. The computer or analyst must then match the alarms to a physical network topology to isolate the location of the failure within the network, typically within a segment of a trunk between two nodes. In sum, existing methods of isolating a network failure include the steps of: (1) receiving numerous alarms from nodes throughout the network; (2) collecting logical topology data for each trunk generating each alarm; (3) applying each received alarm to the logical topology data for each trunk; (4) determining a failed span for each failed trunk, where the failed span can be larger or smaller than the actual physical span of the trunk, depending on the nodes on which the trunk is patched or routed; and (5) combining all determined failed spans and correlating the spans to determine a physical location or span of the failures.

Each node traversed by a failed trunk produces an alarm. Often, multiple trunks fail as a given optic cable fails. Since each trunk in the network typically traverses multiple nodes, the network typically produces numerous alarms from multiple nodes as a result of a failure. Each alarm must be correlated with the logical trunk topology to isolate the failure of a given trunk to a segment between two of the multiple nodes that issued alarms. This is the maximum granularity with which the failure can be isolated. Extensive processing, and thus time, is required to isolate a failure in the network because of the numerous alarms, trunks and nodes in a network. The processing and time also increase as the size of telecommunications networks increases. As noted above, telecommunications carriers wish to restore traffic within a few seconds or less, and thus such delays required to isolate a failure are undesirable. Additionally, if only a few trunks fail, the network may provide an insufficient number of alarms from which to isolate the actual physical span in which the failure occurs.

After isolating the failure, the analyst can then identify the appropriate pre-plan. For example, by isolating the failure on a physical map of the network, the analyst can then identify an alternate route that restores all failed traffic, without sacrificing other traffic or creating new outages. Isolating a failure within the network requires extensive processing, particularly with large networks. Again, such extensive processing necessarily requires processing time, and therefore increases the delay in restoring the network following the failure.

SUMMARY OF THE INVENTION

The present invention enhances network restoration processes by providing an automated method of locating or isolating failures in a network by preferably first periodically performing a process of analyzing the network to develop data, such as in the form of a table, which can be used by a second failure isolation process performed when a failure occurs in the network. The first periodic process, performed, e.g., on a daily basis, analyzes network topology data and preferably creates a table of correlations between the physical or geographic paths along which transmission systems (e.g., optical fibers) are routed with maximum network spans that can be restored with a single restoration route (i.e., failure spans). The table allows simple logical comparisons to be made when a failure occurs. As a result, the second failure isolation process gathers alarms from nodes in the network. This failure isolation process preferably determines which physical paths correspond to the alarms, and then employs the table to compare the paths to failure spans. Consequently, a simple logical statement is made to isolate a failure in the network to a corresponding failure span. As a result, the present invention isolates the failure within the network with precision that is sufficient for determining an optimal restoral route, but is minimized within this range so that processing time is also minimized.

The present invention preferably operates with digital cross-connect (DXC) systems positioned at nodes within the network. While the network may include nodes of various types, only the nodes containing DXC equipment are employed to restore traffic when an outage occurs. The present invention preferably requires only DXC level alarms to isolate the point of a failure in the network. As a result, the present invention reduces the number of alarms to be analyzed. Additionally, the present invention eliminates the need to analyze network trunk topology data each time a failure occurs. Consequently, the present invention employs a reduced set of data to provide an extremely fast method of isolating a failure in a network for a network restoration system.

The present invention embodies a method and apparatus for analyzing a telecommunications network and isolating failures within the network by first analyzing the network to identify all non-terminating paths between DXC nodes, and terminating paths that extend from one DXC node, but terminate before reaching another DXC node. All non-terminating paths are assigned "failure spans" or maximum spans that can be restored with a single restoration route. All terminating paths that correspond to end nodes of the non-terminating path are selected, where each terminating path has a path identifier preferably indicating the inter-node connections of the path. The path identifier is compared to each failure span to create a table of correlations. A similar process is performed for all terminating paths that do not correspond to non-terminating paths in the network. When a failure occurs, all paths are identified for each corresponding alarm and compared to the previously constructed table. A failure span is identified as including a failure if one or more paths are on the failure span and are in alarm, and all paths which are off the failure span are not in alarm. Furthermore, the ports on each path in alarm can be collected to determine whether the network suffers from a full or a partial outage.

In a broad sense, the present invention embodies a method of analyzing a network having a plurality of nodes interconnected by communication paths. Each path has one or more channels traversing two or more nodes. The method includes the steps of: (a) defining maximum spans extending along non-terminating paths in the network, each non-terminating path extending between two selected nodes; (b) selecting any terminating path that traverses each non-terminating path, each terminating path not extending between two of the selected nodes; and (c) correlating a path identifier of each selected terminating path to each defined maximum span of the determined non-terminating paths, each path identifier corresponding to a physically diverse path in the network.

The present invention also embodies a method of isolating a failure within the network. The failure causes a plurality of alarms to be generated from selected nodes. The method includes the steps of: (a) identifying one or more paths associated with alarms related to the failures; (b) comparing the one or more identified paths to data corresponding to a correlation of path identifiers of paths in the network to restoration spans for failures along the plurality of paths, each path identifier corresponding to a physically distinct path in the network; and (c) identifying at least one restoration span based on the step of comparing the retrieved data to the identified paths, the restoration span including therealong the one or more paths producing alarms, and wherein no other paths in the network produce alarms related to the failure.

DETAILED DESCRIPTION OF THE INVENTION

A telecommunications network, and in particular, a method and apparatus for analyzing the network, is described in detail herein. In the following description, numerous specific details are set forth, such as ordering and executing of steps under an analysis routine, certain steps for analyzing portions of a network, etc., in order to provide a thorough understanding of the present invention. One skilled in the relevant art, however, will readily recognize that the present invention can be practiced without the use of the specific details described herein, or with other specific steps in a routine, etc. Well-known structures and steps are not shown or described in detail in order to avoid obscuring the present invention.

Figure 1:
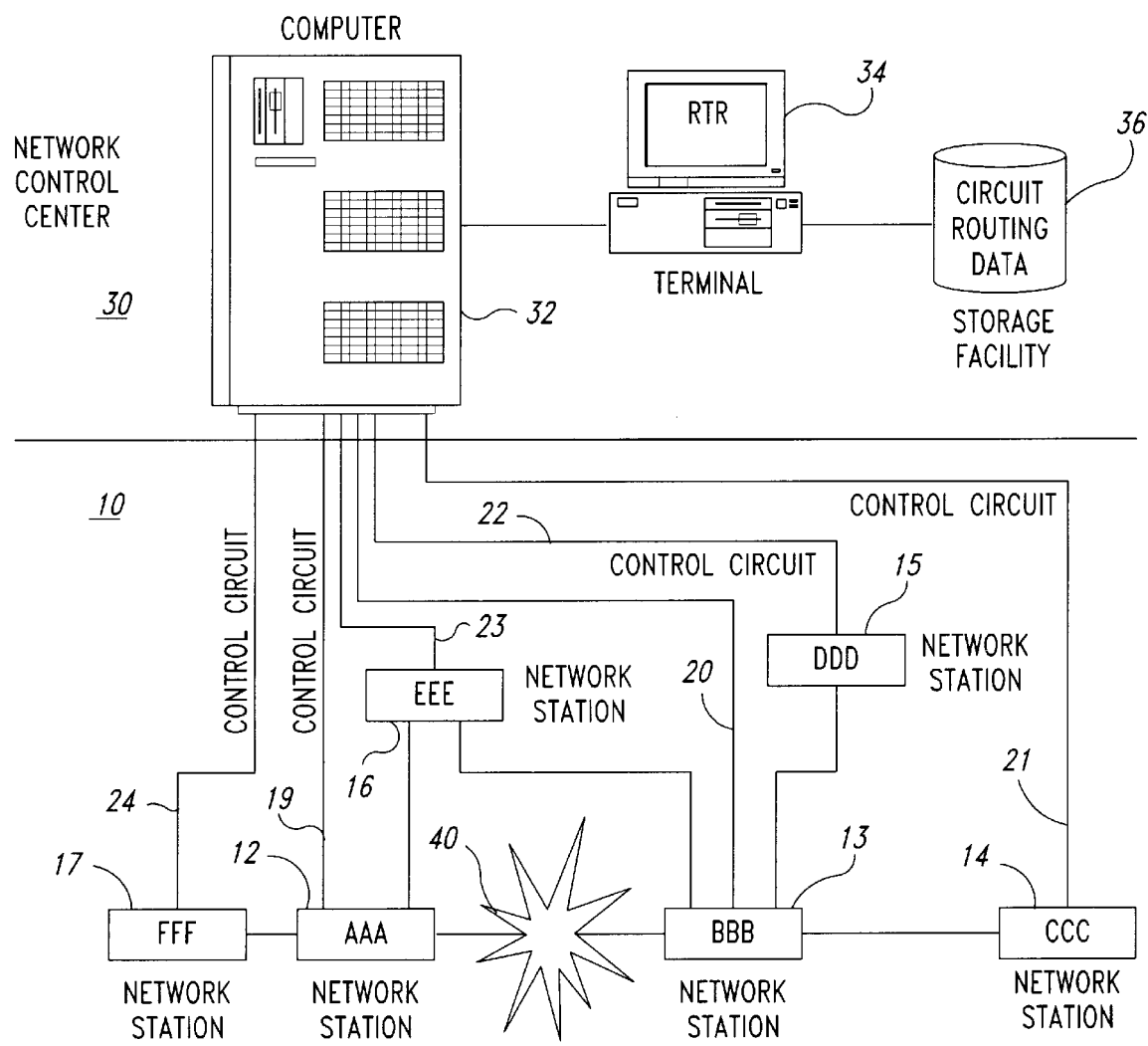
FIG. 1 is a block diagram of a portion of a network, including a network control center.

Referring to FIG. 1, a simplified telecommunication system is shown to help understand the present invention. As shown in FIG. 1, a telecommunications network 10 includes interconnected network stations or nodes AAA, BBB, CCC, DDD, EEE, and FFF, designated as stations 12–17, respectively. A "node" as used generally herein, refers to a physical link in a network, representing a terminal or system which may serve any of a number of functions. For example, each node can include digital cross connect (DXC) systems, multiplexing equipment, line termination equipment, and/or fiber transmission systems. A DXC system is a complex digital switch capable of automatically switching trunks based on external commands; the DXC system essentially permits automatic cross coupling of trunks. A "trunk," as generally used herein, is a logical channel of communications capacity that traverses one or more nodes and one or more links between nodes (e.g., DS-0, DS-1, DS-3, etc.). In other words, a trunk is a channel of communications through the network of a given bandwidth. Line termination equipment and fiber transmission systems typically include light-to-electricity transducers and/or multiplexers, as is known in the art.

Under normal conditions, communications traffic is routed between the network nodes 12–17 along trunks, and between these and other network nodes of the larger network 10 of which the portion shown in FIG. 1 forms a part thereof. Each node typically has a unique address or designator in the network 10. In addition, each node 12–17 is connected by control circuits 19–24, respectively, to a network management or control center 30. The control circuits 19–24 may each be an X.25 circuit, which is a known circuit for carrying control communications between the associated node and the network control center 30.

The network control center 30 includes a computer 32 and a terminal 34 for interacting with the computer 32, which provides an interface for human interaction. The network control center 30 also includes a storage facility or device 36 for storing network and circuit routing data, topology data, pre-plans, etc. Several of such network control centers 30 can be distributed throughout the network 10.

When an outage or disruption of telecommunications traffic occurs, such as the failure 40, the nodes 12–17 that couple to trunks or circuits impacted by the disruption recognize the disruption. In response to the recognized disruption, two or more of the nodes 12–17 generate alarms that are sent over the control circuits 19–24 to the network control system 30. As described below, the network control system 30 determines the location of the outage from these alarms.

Under the present invention, the computer 32 retrieves from the storage facility 36 information about the impacted circuits including the paths that they follow and the equipment they pass through at different nodes along the paths. Based on this data, the network control system 30, or a network analyst, can implement a pre-plan and/or restore telecommunications traffic on the network despite the outage.

The network control center 30 or the analyst implements the alternate routes in the network 10 by establishing new connections via commands transmitted through the control circuits 19–24, or alternately, depending upon the equipment employed at the nodes 12–17, by other means of transmission to effect or direct manual actions to be taken at the nodes. For example, spare high bandwidth DS-3 trunks typically exist throughout the network 10, which can be employed to restore an outage in the network. The network 10 is quite effectively restored when the nodes 12–17 employ DXC systems that can automatically switch from one trunk to another based on commands from the network control center 30.

Figure 2:
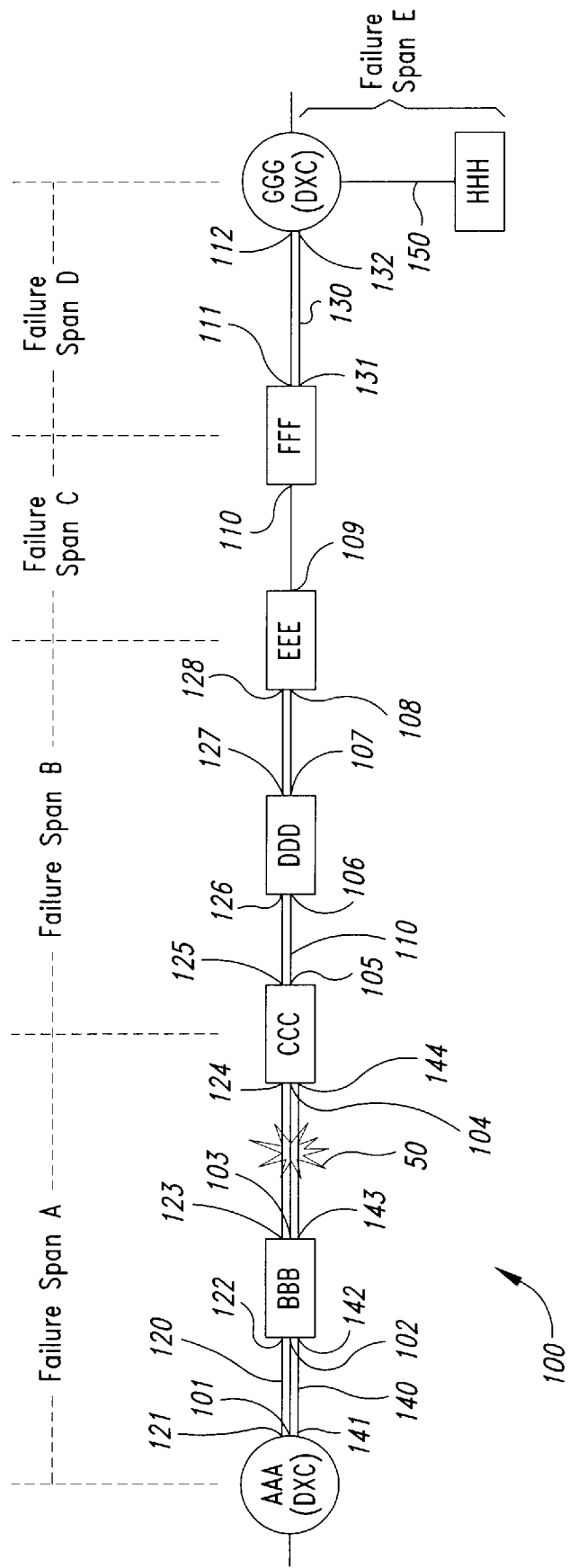
FIG. 2 is a block diagram of the logical topology of a first alternate portion of the network of FIG. 1, showing four paths.

Referring to FIG. 2, an exemplary network portion 100 of the network 10 is shown as having nodes designated as AAA, BBB, CCC, DDD, EEE, FFF, GGG, and HHH. The nodes AAA and BBB, BBB and CCC, CCC and DDD, DDD and EEE, EEE and FFF, FFF and GGG, and GGG and HHH are each coupled by a link. A "link," as generally used herein, is a physical connection between two nodes, representing any type and any capacity of communications between the nodes, such as one or more DS-3 level trunks. A single link usually consists of multiple trunks, and a single trunk consists of one or more links that span multiple nodes. In general, most high capacity networks contain far more trunks than links. The links and paths described herein consist of any type and capacity of traffic trunks, such as optical fiber, microwave transmission, etc.

The nodes AAA and GGG represent nodes having DXC equipment ("DXC nodes"), where the DXC equipment can be used for network restoration. If a failure is detected in the network 10, the DXC equipment at the nodes AAA and GGG can reroute traffic around the failure. In the event of a failure, only alarms from the nodes AAA and GGG are collected and analyzed by a restoration system under the present invention, as described below.

The nodes BBB through FFF are intervening nodes. The nodes BBB through FFF are not necessarily pass-through nodes, since trunks may terminate at some of these nodes. As generally used herein, a "pass-through node" is a node with only two links for which all trunks entering the node leave the node on another link, so that no switching or termination of traffic occurs. In other words, the number of trunks entering the node equals the number of trunks leaving the node; there are no terminating or diverging trunks at that node. A pass-through node can include a digital repeater or generator.

Figure 3:
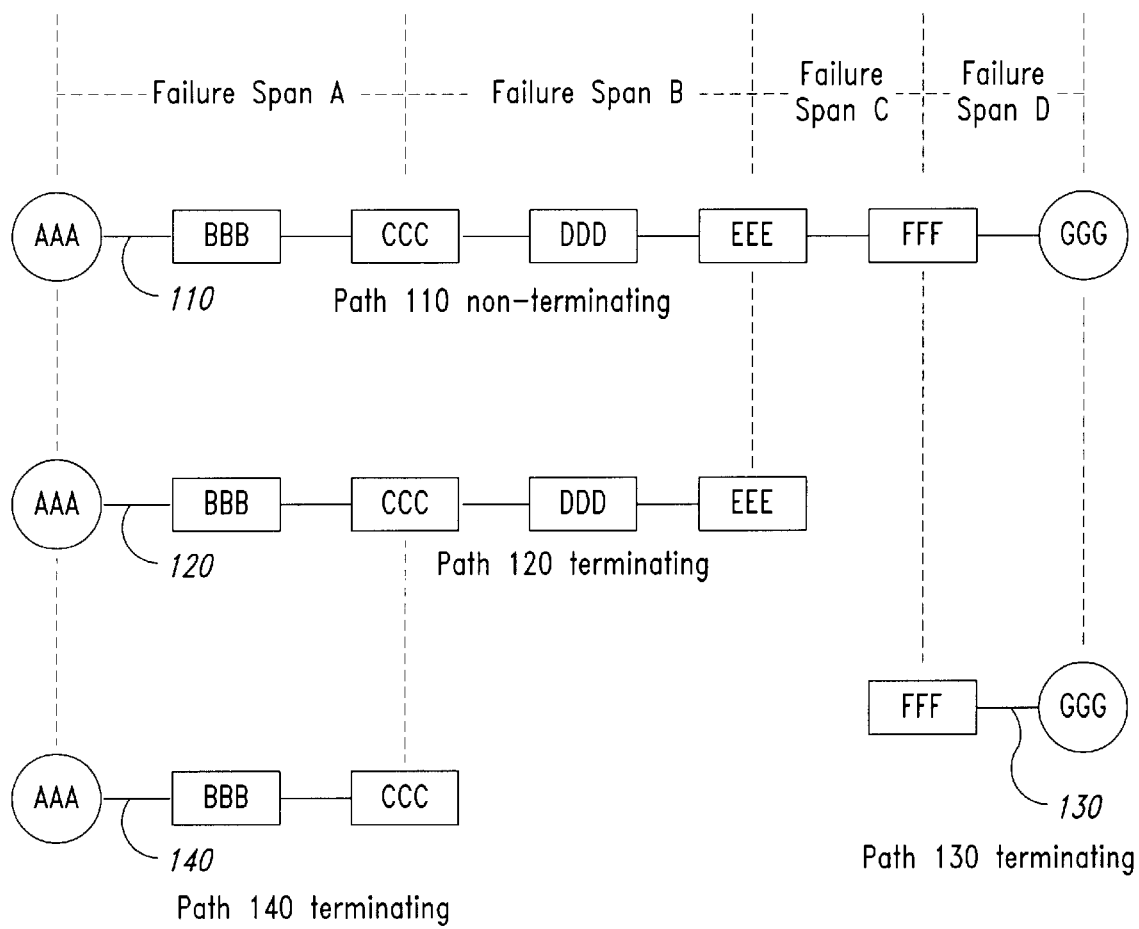
FIG. 3 is a block diagram of the logical topology of the first alternate portion of the network of FIG. 2, showing each of the four paths separately.

As shown in FIG. 2, and more clearly in FIG. 3, the nodes AAA through GGG are intercoupled by a single path 110; the nodes AAA through EEE are intercoupled by a path 120, the nodes FFF and GGG are intercoupled by a path 130, and the nodes AAA through CCC are intercoupled by a path 140. A "path" as generally used herein is a group of one or more trunks that traverse the same set of nodes on the physical route. A link between the two nodes that uses two different physical routes (trunks that are separated into two different routes) would constitute two different paths. Table 1 below summarizes the inter-node connections of the four paths 110–140.

TABLE 1

| Path No. | Nodes Traversed by Path |
| --- | --- |
| 110 | AAA - BBB - CCC - DDD - EEE - FFF - GGG |
| 120 | AAA - BBB - CCC - DDD - EEE |
| 130 | FFF - GGG |
| 140 | AAA - BBB |

The path 110 is a non-terminating path, since it leaves the DXC node AAA and reaches the DXC node GGG without terminating. The path 110 represents one or more trunks that traverse the same physical path. A "non-terminating path," as generally used herein, refers to a path that leaves a node and reaches another node without terminating, particularly DXC nodes.

The paths 120 through 140 represent terminating paths, because each path leaves a DXC node and terminates at an intervening node without reaching another DXC node. For example, the path 120 leaves the DXC node AAA, passes through the nodes BBB through DDD, and terminates at the node EEE. The paths 120 through 140 effectively represent a subset of the path 110 because they traverse a subset of nodes that are traversed by the path 110. The path 130 leaves the DXC node GGG and terminates at the node FFF. A "terminating path," as generally used herein, is a path that leaves a DXC node but does not go to another DXC node. In sum, one end of the path terminates at that DXC node. Terminating paths at a given node indicate that that node will be an end node of a failure span, and distinguishes that node from a pass-through node.

As generally used herein, a "failure span" is a span of the physical topology of the network, consisting of one or more links, having a singular point of failure in which all traffic carried by the span may be restored by a single plan. A failure span is a maximum length of the network 10 (in terms of nodes and links) that can be singularly restored. A failure span greater than two nodes typically includes one or more pass-through nodes between two end nodes. Rather than analyzing each trunk or segments of each trunk within the network 10 to isolate failures, the present invention analyzes failure spans consisting of links within the network. A "segment," as generally used herein, is a single portion of a trunk that spans between two adjacent nodes, or in other words, is a single link of a single trunk.

The path 110 can be sectioned or divided into multiple failure spans, as shown in FIGS. 2 and 3. The present invention preferably employs physical topology data that represents the maximum failure spans of a network, such as the failure spans generated by the inventor's copending U.S. patent application "Method and Apparatus for Determining Maximum Network Failure Spans for Restoration," filed concurrently herewith, and incorporated by reference herein. This application describes an invention which identifies multiple inter-node configurations within a network, such as stranded network non-rings, non-ring network spurs, stranded network rings, network spur nodes with diversity, network segments with pass-through nodes, and network segments without pass-through nodes as maximum failure spans. The maximum failure spans more closely reflect the physical topology, as well as counts of terminating trunks or paths.

The node CCC has at least one trunk which terminates thereat, as represented by the path 140 which ends at the node CCC. As a result, a failure span A extends between the nodes AAA and CCC, and includes the node BBB (which can be a pass-through node). The node EEE similarly has trunks that terminate thereat, as represented by the path 120. As a result, a failure span B extends between the nodes CCC and EEE, and includes the node DDD (which is also a pass-through node). The node FFF similarly is an end node, and thus failure spans C and D extend between the nodes EEE and FFF, and FFF and GGG, respectively. A path 150 extends between the nodes GGG and HHH, and defines a fifth failure span E. Nodes containing DXC equipment are generally end nodes of failure spans because the DXC equipment permits termination and divergence of trunks, rather than pass-through nodes. Therefore, the nodes AAA and GGG are end nodes for failure spans.

Overall, the portion 100 of the network 10 has five failure spans FS-A through FS-E as shown in FIG. 3. Table 2 below summarizes the five failure spans FS-A through FS-E and their inter-node spans.

TABLE 2

| Failure Span | Nodes Traversed by Failure Span |
| --- | --- |
| FS-A | AAA - BBB - CCC |
| FS-B | CCC - DDD - EEE |
| FS-C | EEE - FFF |
| FS-D | FFF - GGG |
| FS-E | GGG - HHH |

Figure 4A:
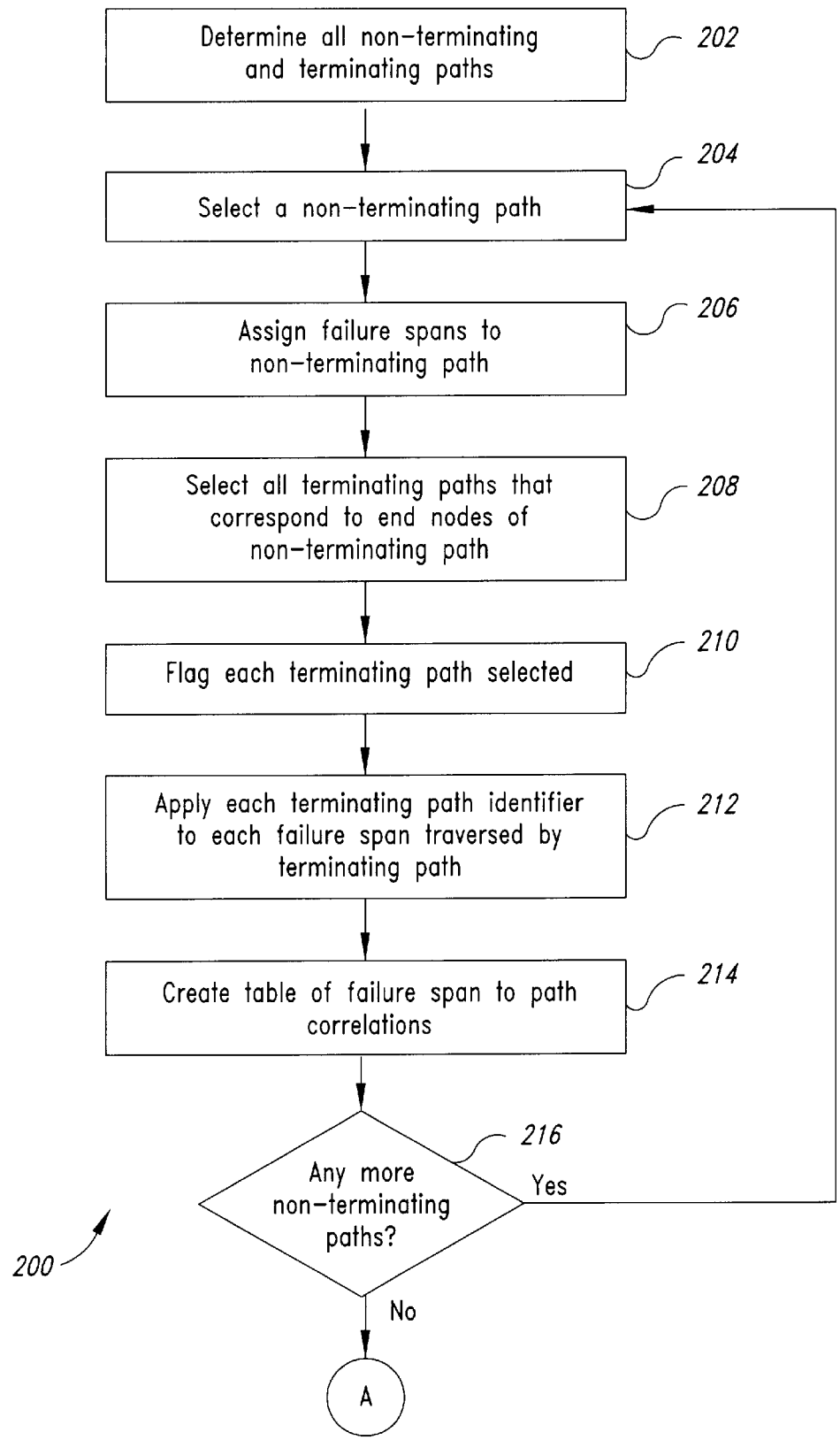
FIGS. 4A and 4B together form an exemplary flowchart diagram of a method for analyzing the network under the present invention.
Figure 4B:
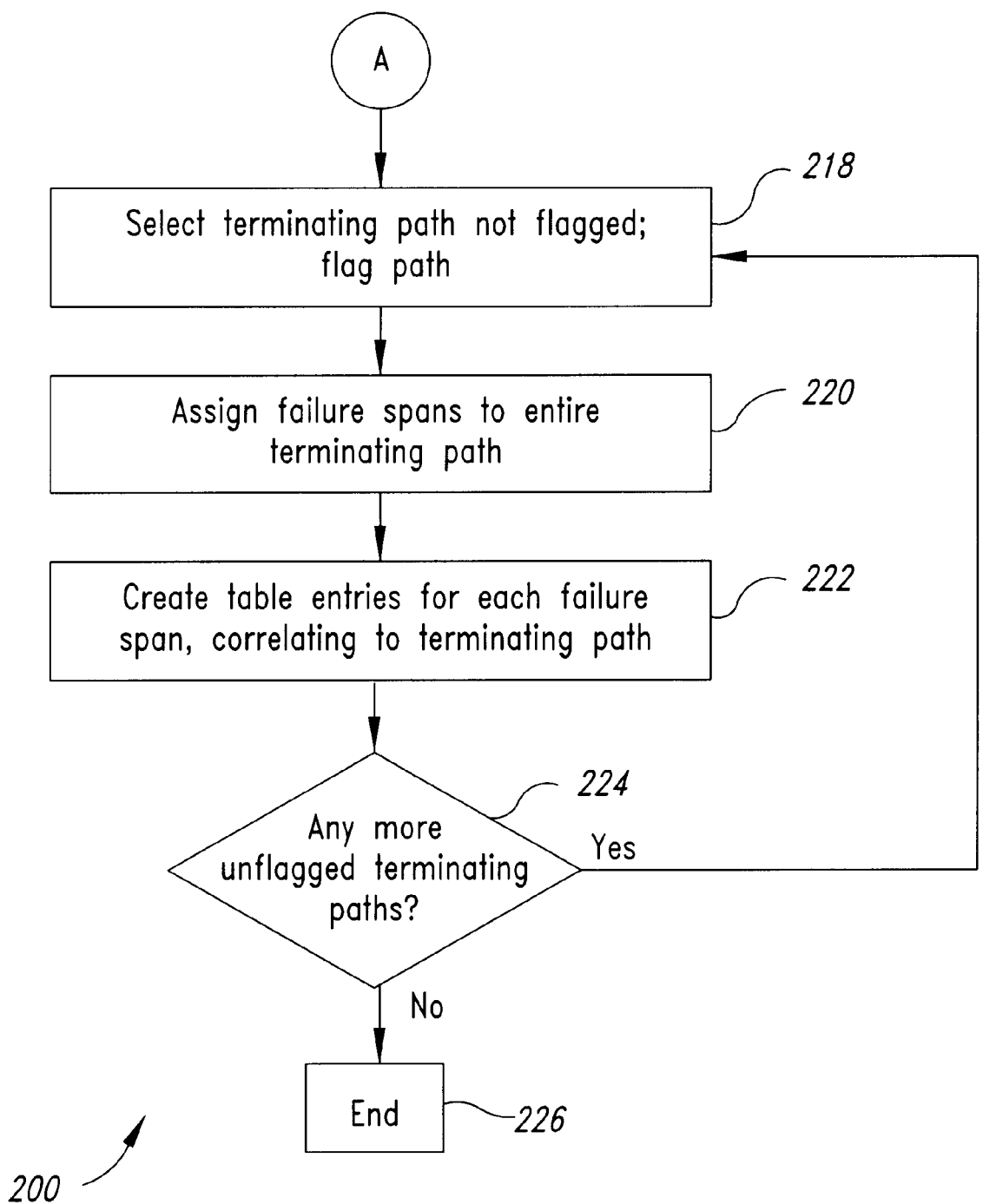

Referring to FIGS. 4A–4B, a routine 200 performed by the computer 32 in the network control center 30 preferably analyzes the network 10 before failures occur. The routine 200 can be performed on any type of computer. The routine 200 twice analyzes the network topology data for the network 10 to create a table showing a unique correlation of paths to failure spans. This table of correlations is then used during network restoration to quickly isolate a failure, such as under a failure isolation routine 300 discussed below.

The routine 200 preferably analyzes the physical topology of the network 10. The physical topology does not change frequently in a typical telecommunications network. Only when a new fiber optic cable is laid or other physical connection paths are added or changed does the physical topology change. Nevertheless, the routine 200 is preferably performed regularly, such as once a day, to virtually guarantee that the stored table is accurate.

The routine 200 of FIG. 4A shows a first analysis of the topology data which is performed to build a table of correlations with all non-terminating paths and terminating paths associated with a non-terminating path. Each terminating path that is associated with a non-terminating path is flagged, so that it is not included under a second analysis of the network topology data. FIG. 4B shows additional steps of the routine 200 under a second analysis of the network topology data to assign failure spans to those terminating paths that were not associated with a non-terminating path in the first analysis. These unassociated terminating paths are unflagged when the steps of the routine 200 in FIG. 4B are initially performed.

Beginning in step 202 (FIG. 4A), the computer 32 analyzes the network topology data to identify all non-terminating and terminating paths. For example, the computer 32 identifies the paths 110 as a non-terminating path and the paths 120 through 140 as terminating paths. The computer 32 in step 202 identifies all terminating and non-terminating paths by converting typical logical trunk topology data to physical topology data, such as under the inventor's copending U.S. patent application entitled "Method and Apparatus for Deriving and Representing Physical Network Topology," filed concurrently herewith, and incorporated by reference herein. After deriving the physical network topology data, the computer 32 in step 202 identifies physical paths, and determines which paths are traversed by which trunks. The computer 32 assigns path identifiers to each path, and similarly assigns the path identifiers to each port that is traversed by the path, such as is described in the inventor's copending U.S. patent application entitled "Method and Apparatus for Identifying Restoral Routes in a Network," filed concurrently herewith, and incorporated by reference herein. As a result, when a failure occurs and ports associated with the failure issue alarms, the corresponding path identifier can be transmitted or provided to the computer 32 with the alarm, as described below.

In step 204, the computer 32 selects a non-terminating path. For example, the computer 32 selects the non-terminating path 110. Under the routine 200, all non-terminating paths in the network 10 are eventually selected and processed.

In step 206, the computer 32 determines failure spans assigned to the selected non-terminating path. Failure spans can be determined under, for example, the inventor's above-noted application entitled "Method and Apparatus for Determining Maximum Network Failure Spans for Restoration." Since the end nodes of a non-terminating path are also end nodes of failure spans (based on the above definitions), the determined failure spans typically match the non-terminating paths exactly. In other words, a failure span will not extend between two non-terminating paths, but instead be at least two different failure spans divided between the two non-terminating paths at a common node. For the example of FIGS. 2 and 3, the path 110 is divided into four failure spans FS-A through FS-D, as explained above.

In step 208, the computer 32 selects all terminating paths that correspond to the end nodes of the selected non-terminating path. These terminating paths overlap the non-terminating path to some degree. For example, the paths 120, 130 and 140 are all terminating paths that overlap the selected non-terminating path 110, each to varying degrees, as shown in FIGS. 2 and 3. The terminating paths 120, 130 and 140 each have one end node which is shared with one of the end nodes of the selected non-terminating path 110. As a result, all three terminating paths 120 through 140 are selected in step 208.

In step 210, the computer 32 flags each terminating path selected under step 208. Each terminating path flagged under step 210 excludes that path from being processed under the second series of steps (steps 218–224 of FIG. 4B). A terminating path can be analyzed multiple times under the first series of steps (steps 204–216 of FIG. 4A), if the path can be associated to multiple non-terminating paths. Such a situation is not unusual in typical networks. For example, a non-terminating path could extend from the node AAA through the node EEE, and then to a DXC node III (not shown). As a result, the terminating paths 120 and 140 would be associated with both the path 110, and the hypothetical path extending to the node III.

In step 212, the computer 32 applies or assigns the path identifier of each terminating path to each failure span assigned in step 206. The path identifier is unique to each physically diverse or distinct path in the network 10. Paths which follow the exact same physical route are assigned the same path identifier. While the paths 110, 120 and 140 each extend between the nodes AAA and BBB, they each include a different set of nodes, and thus each have a different path identifier. The path identifiers for the paths 110 through 140 preferably include data representing the nodes traversed by the corresponding path. For example, the path 120 preferably has the path identifier AAA-BBB-CCC-DDD-EEE, while the path 140 preferably has the path identifier AAA-BBB-CCC.

In step 214, the computer 32 creates a table of entries that correlate each failure span to both the non-terminating path and each selected terminating path. Since each failure span corresponds to a series of intercoupled nodes, and each path identifier similarly includes a series of intercoupled nodes, the computer 32 simply compares the series of nodes of the path identifiers to the series of nodes of the failure spans. Each entry in the table corresponds to a failure span. Associated with each failure span entry in the table are designators for those paths that traverse the failure span, listed as paths which are "ON" the failure span, and designators for those paths that do not traverse the failure span, listed as paths which are "OFF" the failure span.

Since a non-terminating path was initially employed under step 206 to identify failure spans therealong, the path identifiers in the table for the non-terminating paths will always be listed as "ON" for each failure span. For example, each of the four failure spans FS-A through FS-D indicates that the path 110 is "ON" the corresponding failure span. Path identifiers, however, for the terminating paths will be listed as "ON" for each failure span traversed by the terminating path, and will be listed as "OFF" for each failure span not traversed by the terminating path. For example, both of the terminating paths 120 and 140 are "ON" the failure span A, while only the terminating path 130 is "ON" the failure span D. An example of such a table produced by the computer 32 for the portion 100 is shown in Table 3 below.

TABLE 3

| Failure Span | Path ON | Path OFF |
| --- | --- | --- |
| FS-A | 110, 120, 140 | 130 |
| FS-B | 110, 120 | 130, 140 |
| FS-C | 110 | 120, 130, 140 |
| FS-D | 110, 130 | 120, 140 |
| FS-E | 150 | 110, 120, 130, 140 |

In step 216, the computer 32 determines whether any more non-terminating paths exist within the network topology data. If so, the routine 200 loops back to step 204, and the computer 32 again performs the steps 204 through 216 until all non-terminating paths have been analyzed.

Referring to FIG. 4B, the computer 32 begins a second analysis of the network topology data to process terminating paths that were not associated with a non-terminating path under steps 204 through 216. Such non-terminating paths will not have been previously flagged under step 210. Such terminating paths represent spurs in the DXC level network data, but may not necessarily represent spurs in the topology of the entire telecommunications network. For example, as shown in FIG. 2, the path 150 extends from the DXC node GGG to the non-DXC node HHH. Neither the path 150 nor any other paths extend from the DXC node GGG, through the node HHH, to another DXC node. As a result, the path 150 represents a network spur at the DXC level of analysis that is performed under the present invention.

In step 218, the computer 32 selects a terminating path which has not been previously flagged. The computer 32 then flags the selected path. For example, the computer 32 selects the terminating path 150 and flags it.

In step 220, the computer 32 determines failure spans for this terminating path, and assigns such failure span to the entire path. Such a terminating path could include one or more failure spans. For example, as explained above, the terminating paths 120 and 140 both share the failure span FS-A. The assigned failure spans will exactly match the terminating path. For example, the failure span E is assigned to the terminating path 150.

In step 222, the computer 32 creates entries in or adjusts the table created in step 214 for each failure span determined in step 220. The computer 32 adds the designators in the table for the selected terminating path. Each of the designators will be "ON" the path; there will be no "OFF" paths for such entries.

In step 224, the computer 32 determines whether any additional unflagged terminating paths exist in the network topology data. If so, the routine 200 loops back to step 218, and the computer 32 again performs the steps 218 through 224 until all terminating paths have been analyzed. The routine 200 then ends in step 226.

The tables noted herein illustrate only one of multiple formats of a table that can be constructed under the present invention; however, various other formats can be employed. In general, a "table" corresponds to any organized set of data produced by the present invention. Such tables are stored in the storage device 36. Alternately, rather than constructing a table per se, the computer 32 can store the results of the correlations or other processes under the present invention in an appropriate database for use by other routines, such as the routines described herein.

The computer 32 performs the routine 200 before a failure occurs in the network 10, so that the network topology data is analyzed at a non-critical time. If a failure occurs, when fractions of a second are critical in restoring the network 10, a simple comparison of paths issuing alarms to the table created in steps 214 and 222 will isolate a failure to a failure span so that an appropriate restoration plan can be identified and implemented.

Figure 5:
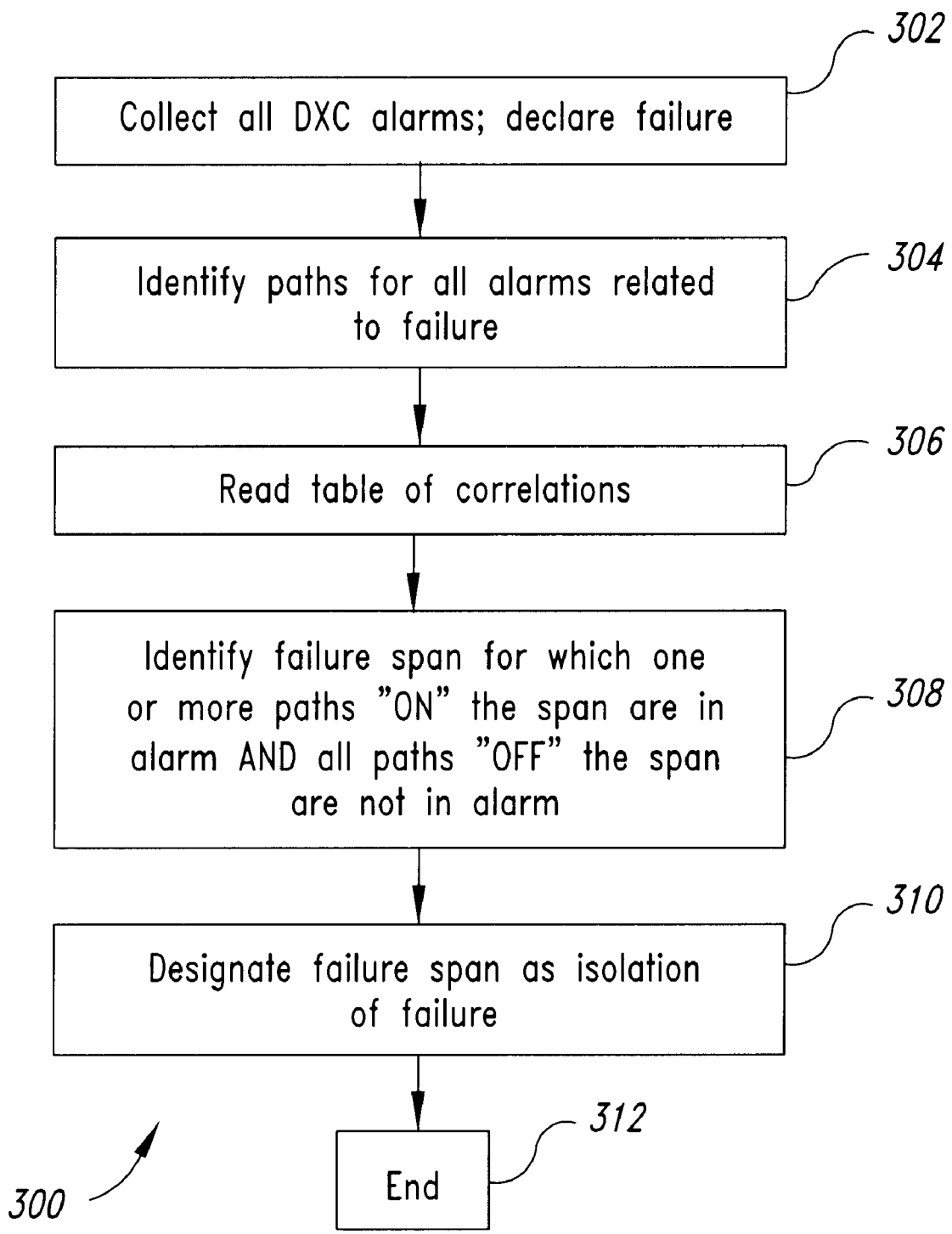
FIG. 5 is an exemplary flowchart diagram of a method for isolating network failures under the present invention.

Referring to FIG. 5, a routine 300 performed by the computer 32 isolates failures in the network 10 when a failure is detected. Beginning in step 302, the computer 32 determines or declares that a network failure has occurred and alarms related to the failure are identified. The computer 32 receives or collects all DXC level alarms from the network 10.

Each trunk of a path that traverses a node enters that node on one port and leaves the node on another port. For example, the trunks of the path 120 enter the node CCC on a port 124 and leave the node CCC on a port 125. Use of the terms "enters" and "leaves" is arbitrary; the directionality of trunks or paths within the network 10 is irrelevant. Each trunk that terminates at a node enters that node on a specific port. For example, the trunks of the path 140 terminate at the node CCC at a port 144.

When a failure occurs in the network 10, each trunk that is impacted by the failure will cause nodes coupled to that trunk to generate alarms. Only those nodes that are positioned towards or "face" the point of failure will generate an alarm. For example, if a failure 50 occurs between the nodes BBB and CCC, all of the trunks for the paths 110, 120 and 140 can be impacted. The trunks of the path 110 will cause ports 101, 103, 104, 106, 108, 110 and 112 of the nodes AAA, BBB, CCC, DDD, EEE, FFF and GGG, respectively, to generate alarms, since the ports face the failure 50. Ports 102, 105, 107, 109 and 111, however, of the nodes BBB, CCC, DDD, EEE and FFF will not generate alarms since they face "away" from the failure 50. Likewise, the trunks of the paths 120 and 140 will cause ports 121, 123, 124, 126 and 128 of the nodes AAA through EEE, and the ports 141, 143 and 144 of the nodes AAA through CCC, allow respectively, to generate alarms. Ports 122, 125 and 127 of the nodes BBB through DDD for the path 120, and the port 142 of the node BBB for the path 140 will not generate alarms.

Under the present invention, the computer 32 is usually capable of receiving alarms from many different nodes in the network 10. In one embodiment, the alarms are of the type that help indicate the direction toward the point of the failure in the network, either alone or in conjunction with other data. In an alternate embodiment, the total number of alarms collected could be a set that is fewer than all alarms on the trunk. If trunks or paths issue many alarms, the system may stop after sufficient alarms are collected for fewer than all alarms from a path.

In step 304, the computer 32 identifies the paths issuing alarms. Each alarm received preferably includes the path identifier associated with the path. Such path identifiers are preferably those described in the inventor's above-noted application entitled "Method and Apparatus for Identifying Restoral Routes in a Network." As a result, the computer 32 recognizes which paths are issuing alarms (are "in alarm") and which paths are not in alarm.

The computer 32 under step 304, for example, can construct a table, stored in the storage facility 36, which determines whether each path in the network 10 is in alarm. Under the present example, the paths 110, 120 and 140 are in alarm, while the path 130 is not. The computer 32 then constructs a table, such as Table 4 below.

TABLE 4

| Path | In Alarm? |
|------|-----------|
| 110  | Y         |
| 120  | Y         |
| 130  | N         |
| 144  | Y         |

In step 306, the computer 32 retrieves the table or other data developed under the routine 200. The computer 32 preferably retrieves the table from the storage facility 36, such as Table 3 above.

In step 308, the computer 32 matches the paths in alarm and not in alarm to each failure span in the retrieved table. All failure spans are identified for which one or more "ON" paths are in alarm and no "OFF" paths are in alarm. If sufficient alarms are received, then the computer 32 can identify a single failure span. (As discussed below, if only a few trunks fail in the network 10, the computer 32 can isolate the failure to more than one failure span.) The identified failure span will be the failure span actually incurring the failure, and thus in step 310, the computer 32 designates the failure span as the isolation of the failure.

For example, the computer 32 compares the paths in alarm under Table 4, with the failure spans in Table 3. The computer 32 identifies a failure span for which (i) one or more paths are "ON" the identified failure span and are in alarm, and (ii) all paths that are "OFF" that failure span are not in alarm. In other words, the computer 32 determines whether any paths for an identified failure span are "ON" the span but not in alarm. The paths 110, 120 and 140 are in alarm, and are all on the failure span A. Thus, the only failure span which satisfies this condition is failure span A, and consequently the computer 32 identifies this failure span as the isolation of the failure in step 310. While the failure spans 110 and 120 are in alarm and are on the failure span B, the failure span 140 is also in alarm, but is off the failure span B. Therefore, the failure span B is not the isolation of the failure. Thereafter, the routine 300 ends in step 312.

Figure 6:
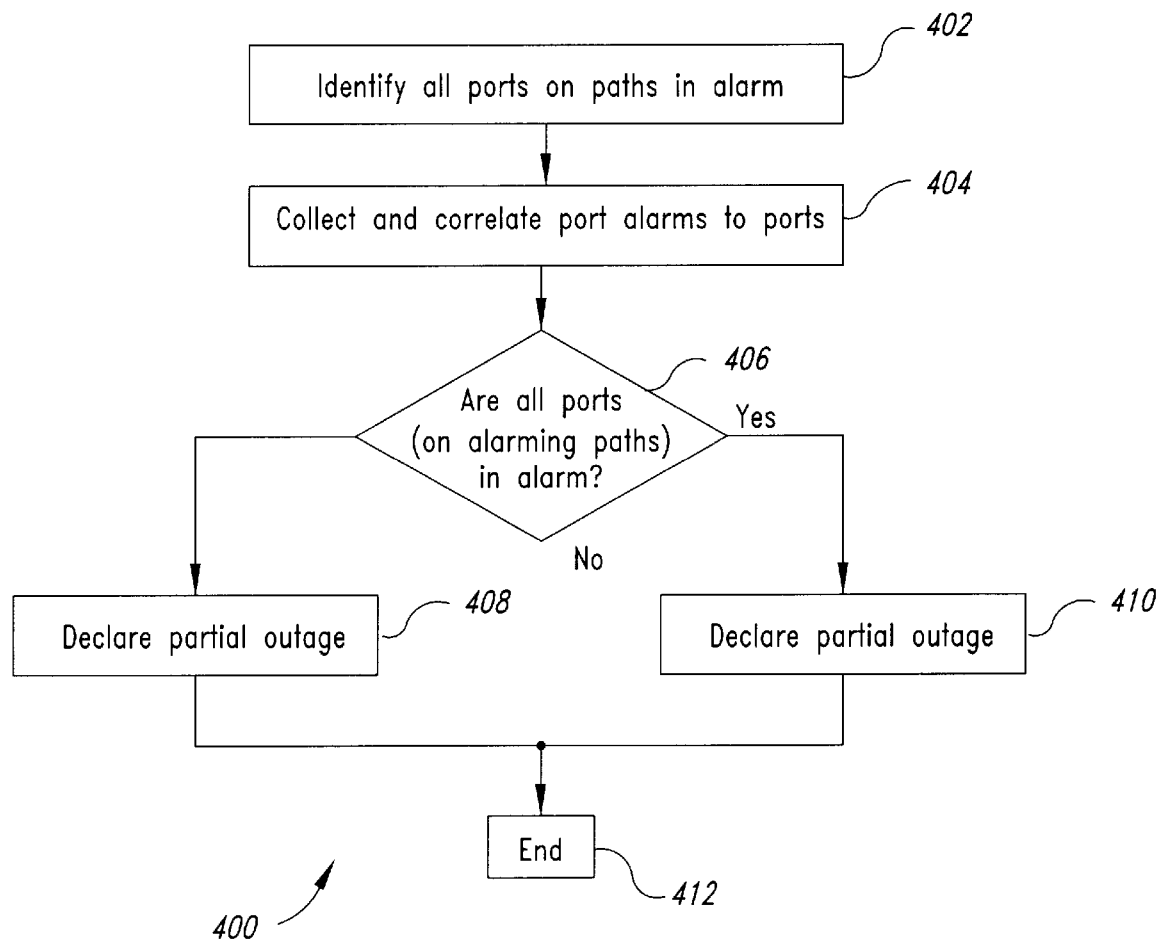
FIG. 6 is an exemplary flowchart diagram of an additional embodiment for isolating network failures under the present invention.

Referring to FIG. 6, a routine 400 performed by the computer 32 provides an additional series of steps which can be employed to determine whether the failure isolated under the routine 300 corresponds to a full or partial outage of the network 10. The routine 400 is preferably performed after the step 310 of the routine 300. The failure determined under the routine 300 can be a partial failure if some ports traversed by a path in alarm do not issue alarms.

Any path is considered in alarm in the network 10 if any of its ports are in alarm. A partial failure occurs, for example, if a bundle of fibers incurs an outage to one fiber, but not another. A slowly burning cable of fibers can experience such a condition. Therefore, while numerous alarms may be generated at a given moment, sometime thereafter, after some additional optical fibers fail, the network will produce more numerous alarms. A full failure or outage occurs if all transmission systems (e.g., all optical fibers in a cable) fail, and therefore all trunks along a path experience a failure and issue alarms from associated ports.

The routine 400 determines if the failure determined under the routine 300 is either a partial or a full failure by determining if all ports along an alarming path are in alarm. Beginning in step 402, the computer 32 identifies all ports traversed by a path in alarm, including the nodes at which a given port is located. For example, referring to FIG. 2, if the failure 50 affects the paths 110 and 140 between the nodes BBB and CCC, but not the path 120, the computer 32 in step 402 identifies the ports 101 through 112 for the path 110, and the ports 141 through 144 for the path 140. Such a situation could occur if the trunks of the path 120 are supported on a first optical fiber, and the trunks of the paths 110 and 140 are supported on a second fiber, where the second fiber has been cut, but the first fiber has not been cut. The computer 32 determines that ports along the paths 110 and 140 produce alarms, but the ports along the path 120 do not produce alarms. As a result, the computer 32 in step 304 develops a table under the routine 300, such as the Table 5 below.

TABLE 5

| Path | In Alarm? |
|------|-----------|
| 110  | Y         |
| 120  | N         |
| 130  | N         |
| 140  | Y         |

Comparing Table 5 with Table 3, the computer 32 under step 308 would still identify the failure span A as the isolation of the failure. However, under step 404 of the routine 400 (FIG. 6), the computer 32 correlates the alarms collected under step 302 (FIG. 5) with the ports identified under step 402. Since each alarm includes a path identifier that indicates the nodes traversed by the path coupled to the corresponding port, the computer 32 can readily compare the ports identified in step 402 with the path identifiers.

In step 406, the computer 32 determines if all ports identified in step 402 are in alarm. If they are, such as in the previous example with Table 4, then the computer 32 declares a full outage on the failure span A. If not, such as in the current example of Table 5, then in step 410 the computer 32 declares a partial outage. For example, the computer 32 recognizes that under Table 5, path 120 is "ON" the failure span A, but is not in alarm. As a result, the computer 32 determines that the failure span A has incurred a partial failure. In an alternate embodiment, the computer 32 directly analyzes the ports of the path 120 to determine that none of the ports 121 through 128 are in alarm, even though the path 120 shares the failure span A with the paths 110 and 140, which are in alarm. In such an alternative embodiment, the computer 32 does not construct a table, such as Table 5 above.

If the computer 32 receives an insufficient number of alarms, such as during a partial failure, the computer could isolate the failure to within two or more failure spans. For example, if only the path 120 were in alarm, and the paths 110, 130 and 140 were not in alarm, the computer 32 under the routine 300 would isolate the failure to within failure span A or B. Under the routine 400, the computer 32 would determine that the failure under this example were a partial failure. The computer 32, in such an instance, could then employ an alternate failure isolation routine, such as the inventor's copending U.S. patent application entitled "Method and Apparatus for Isolating Network Failures by Applying Alarms to Failure Spans," filed concurrently herewith, and incorporated by reference herein.

After determining a partial failure, the computer 32 preferably selects a restoral route which employs physical paths differing from the paths in alarm by selecting a restoral route having a path identifier different from the path identifiers associated with the alarms collected under step 302. Such a method of selecting physically or geographically diverse restoral routes is described in detail in the inventor's copending U.S. patent application entitled "Method and Apparatus for Identifying Restoral Routes in a Network," as discussed above.

The routine 200 of the present invention analyzes the network topology data before any failures occur in the network 10 to establish a table of failure spans correlated with paths. The table can then be used under the routines 300 and 400 to isolate a failure at a very high speed during the restoration process, since the trunk topology data for the entire network 10 need not be analyzed. A failure is isolated by simply comparing path identifiers of alarms received with the alarms to the previously created table, such as Table 3. As a result, a much reduced set of data is analyzed to isolate a failure in the network 10 over the systems.

The present invention also identifies a failure to within a failure span, which is the maximum level of analysis or granularity to isolate and correct a failure within the network 10. For example, the computer 32 analyzes the portion 100 of the network 10 to locate the failure 50 within the failure span A which extends between the nodes AAA and CCC. The invention need not determine whether the failure 50 occurs between the nodes AAA and BBB or between the nodes BBB and CCC, since a restoral route between the nodes AAA and CCC will compensate for any failure therebetween.

The present invention, however, could also further identify the particular segment or link containing the failure. Under such an alternate embodiment, the computer 32 first identifies pairs of intercoupled nodes in the failure span identified under step 310. The computer 32 determines a pair of nodes within the identified failure span having alarms directed toward each other. Based on this determined pair of nodes, the computer 32 isolates the failure as a link in the network 10 positioned between these two nodes. For example, the computer 32 determines that the ports 103 and 104 of the nodes BBB and CCC in the failure span FS-A produce alarms directed towards each other. As a result, the computer 32 determines that the link therebetween contains the failure 50.

In another alternate embodiment to the present invention, the granularity of the analysis performed under the routines 200–400 by the computer 32 can vary. The present invention has generally been described above as analyzing only DXC level nodes. However, the granularity of the failure isolation under the routine 300 can be increased. To so increase failure isolation, the granularity of the failure spans must be increased so that the failure spans include lower level nodes. Based on the increased granularity failure spans, the routine 300 can, in many circumstances, isolate failures with increased granularity. However, under such an alternate embodiment, the processing time is necessarily increased.

In general, the present invention locates failures to within maximum spans of a network that can be singularly restored (i.e., within failure spans). As a result, the present invention can sufficiently isolate a failure using few data points and consequently faster analysis, which minimizes the processing and time required to locate the failure. In other words, the present invention significantly reduces the processing time by reducing the number of paths or trunks analyzed and increasing the length of network segments analyzed when isolating a failure. While prior art methods required analysis of multiple segments of multiple trunks, the present invention requires only a few alarms from one or more paths extending through a failure span to be analyzed, even though the failure span can include multiple segments and links of multiple trunks.

After identifying a failure within a failure span in the network 10 under the routine 300, the computer 32 can compensate for the failure under a prescribed pre-plan. Each failure span having a failure isolated under the routine 300 will determine what restoration pre-plan is needed for that portion of the network 10. Alternatively, the present invention can be employed to create pre-plans by simulating failures in the network 10. Pre-plans, which result in a 1-to-1 correspondence between each failure in the network 10 and a restoral route, can furthermore be effectively and efficiently generated under the inventor's above-noted copending U.S. patent applications entitled "Method and Apparatus for Identifying Diverse Restoral Routes in a Network," "Method and Apparatus for Deriving and Representing Physical Network Topology," and "Method and Apparatus for Isolating Network Failures By Correlating Paths in Alarms With Failure Spans." By maximizing a network span to identify a failure span, the efficiency of restoration pre-plans are maximized, by minimizing the number of pre-plans needed for the network 10.

The failure isolation technique under the routine 300 can not only be corrected under a pre-plan, but also under dynamic route generation. Under dynamic route generation, the computer 32 dynamically calculates a restoral route after detecting and isolating a failure, rather than generating a pre-plan prior to such a failure. Dynamic route generation is preferably entirely automatic, without human interaction, and thus can be more efficient and timely than current methods for implementing pre-plans.

As noted above, prior art network restoration systems use logical trunk topology to isolate network failures and determine restoral routes. Such prior systems require numerous algorithms to be processed in order to correlate alarms received from the various trunks, based on the equipment and nodes traversed by each trunk, to locate the physical point of failure in the network. Performing these algorithms during the restoration process introduces unnecessary and costly delays. The present invention, conversely, employs failure spans based on physical topology data (i.e., node and inter-node links) to determine a maximum network span that can be treated or implemented with a single pre-plan, and thereby expedite the restoration process.

Often, multiple trunks along a link suffer failures, and thus each trunk causes two or more alarms to issue. As noted above, failure spans are defined as being a maximum network span that can be restored with a single restoration route, in terms of two or more nodes and links therebetween. Thus, failure spans generally cannot include traffic that diverges or terminates therein. In other words, all trunks that are part of a failure span must fully traverse the span. As a result, only one failed trunk and alarms issued therefrom need to be processed under the present invention to identify the failure span of other trunks that traverse the failure span. Consequently, by restoring the failure span, all trunks impacted by the failure will be restored, which provides a significant improvement in processing time over prior methods.

Although specific embodiments of, and examples for, the present invention are described herein for illustrative purposes, various equivalent modifications can be made without departing from the spirit and scope of the invention, as will be recognized by those skilled in the relevant art. The teachings provided herein of the present invention can be applied to other communications or network systems, not necessarily the exemplary systems described above. For example, while the present invention as been generally described above as being employed in the telecommunications network 10, the present invention is equally applicable to other communication systems, such as a network of computers.

The present invention can employ data based on a trunk of any type and capacity from which the present invention isolates failures within failure spans. Furthermore, while the terms trunk, path and link are defined above as routing telecommunications traffic, the present invention can analyze and isolate failures within any communication channel between nodes and employ any topology data representing such channels or paths, as will be understood by those skilled in the relevant art. Moreover, the term node applies to any point receiving or transmitting signals, not necessarily a DXC system or other telecommunications equipment coupled between two trunks.

While certain operations under the present invention have been described as occurring generally in a serial fashion, those skilled in the relevant art will recognize that it is entirely within the scope of the invention to conduct some operations more or less simultaneously, or even in alternative order, from that described herein. Furthermore, the present invention can be modified to include or employ the systems and concepts of the inventor's copending applications noted above.

These and other changes can be made to the invention in light of the above detailed description. In general, in the following claims, the terms used should not be construed to limit the invention to the specific embodiments disclosed in the specification and the claims, but should be construed to include any network analysis system that operates under the claims. Accordingly, the invention is not limited by the disclosure, but instead its scope is to be determined entirely by the following claims.

I claim:

1. In a telecommunication network having a plurality of nodes interconnected by paths, each path having one or more trunks traversing two or more nodes, a method for analyzing the network comprising the steps of:

analyzing data representing the network to determine paths that terminate between two selected nodes and paths that do not terminate between two selected nodes;

defining maximum restoration spans extending along each of the determined non-terminating paths;

selecting any terminating paths that physically traverse a portion physically traversed by each non-terminating path;

correlating a path identifier of each selected terminating path to each defined maximum restoration span of the determined non-terminating paths, each path identifier corresponding to a physically diverse path in the network; and creating an organized set of data representing the correlated path identifiers of each selected terminating path with the maximum restoration spans of the determined non-terminating paths.

2. The method of claim 1 wherein the step of selecting any terminating paths that traverse each non-terminating path includes the step of flagging any selected terminating path, and wherein the method further includes the steps of:

selecting each unflagged terminating path;

defining maximum restoration spans extending along each of the selected unflagged terminating paths;

correlating a path identifier of each selected unflagged terminating path to each defined maximum restoration span of the unflagged terminating paths; and adjusting the organized set of data to include representations of the correlated path identifiers of each selected unflagged terminating path with the maximum restoration spans of the unflagged terminating paths.

3. The method of claim 1 wherein the two selected nodes are nodes having digital cross-connect systems, and wherein the step of analyzing data representing the network includes determining that non-terminating paths extend between two nodes having digital cross-connect systems coupled to the non-terminating paths and determining that terminating paths extend between and are coupled to one node having digital cross-connect systems and another node which does not have digital cross-connect systems.

4. The method of claim 1 wherein the step of defining maximum restoration spans includes defining a series of nodes traversed by each determined non-terminating path, wherein each path identifier includes a list of nodes traversed by each selected terminating path, and wherein the step of correlating a path identifier of each selected terminating path to each defined maximum restoration span includes correlating the list of nodes of each selected terminating path with the series of nodes of each determined terminating path.

5. The method of claim 1 wherein the step of analyzing data representing the network includes analyzing physical topology data corresponding to the two selected nodes traversed by each path.

6. The method of claim 1 wherein the step of creating an organized set of data representing the correlated path identifiers creates a table comparing the correlated path identifiers of each selected terminating path with the maximum restoration spans of the determined non-terminating paths.

7. In a network having a plurality of nodes intercoupled by communication paths, each path having one or more channels traversing two or more nodes, a computer implemented method for analyzing the network comprising the steps of:

defining maximum spans extending along non-terminating paths in the network, each non-terminating path extending between two selected nodes;

selecting any terminating paths that substantially traverse portions of non-terminating paths, each terminating path not extending between two of the selected nodes;

correlating a path identifier of each selected terminating path to each defined maximum span of the determined non-terminating paths, each path identifier corresponding to a physically diverse path in the network; and outputting data corresponding to the correlation of each path identifier to each defined maximum span.

8. The method of claim 7, further comprising the step of creating an organized set of data representing the correlated path identifiers of each selected terminating path with the restoration spans of the determined non-terminating paths.

9. The method of claim 7 wherein the maximum spans are maximum restoration spans, wherein the step of selecting any terminating paths that traverse each non-terminating path includes the step of flagging any selected terminating path, and wherein the method further includes the steps of:

selecting each unflagged terminating path;

defining maximum restoration spans extending along each of the selected unflagged terminating paths; and correlating a path identifier of each selected unflagged terminating path to each defined maximum restoration span of the unflagged terminating paths.

10. The method of claim 7 wherein the selected nodes are nodes having automatic cross coupling capability, and wherein the step of analyzing data representing the network determines that non-terminating paths extend between two nodes having automatic cross coupling capability and determines that terminating paths extend between one node having automatic cross coupling capability and another node which does not have automatic cross coupling capability.

11. The method of claim 7 wherein the step of defining restoration spans includes defining a series of nodes traversed by each determined non-terminating path, wherein each path identifier includes a list of nodes traversed by each selected terminating path, and wherein the step of correlating a path identifier of each selected terminating path to each defined restoration span includes correlating the list of nodes of each selected terminating path with the series of nodes of each determined terminating path.

12. The method of claim 7, further comprising the step of analyzing data representing the network, the data corresponding to nodes traversed by each path.

13. In a network having a plurality of nodes interconnected by communication paths, each path having one or more channels traversing two or more nodes, an apparatus for analyzing the network comprising:

a storage device having stored therein data corresponding to path identifiers corresponding to physically diverse paths in the network, and maximum spans extending along non-terminating paths in the network, each non-terminating path extending between two selected nodes; and a computer system coupled to the storage device, the computer system (a) selecting any terminating paths that substantially traverse portions of non-terminating paths, each terminating path not extending between two of the selected nodes, and (b) correlating a path identifier of each selected terminating path to each defined maximum span of the non-terminating paths.

14. The apparatus of claim 13, wherein the computer system creates an organized set of data representing the correlated path identifiers of each selected terminating path with the restoration spans of the non-terminating paths, and stores the set of data in the storage device.

15. The apparatus of claim 13 wherein the maximum spans are maximum restoration spans and wherein the computer system (a) flags any selected terminating path, (b) selects each unflagged terminating path, (c) defines maximum restoration spans extending along each of the selected unflagged terminating paths, and (d) correlates a path identifier of each selected unflagged terminating path to each defined maximum restoration span of the unflagged terminating paths.

16. The apparatus of claim 13 wherein the selected nodes are nodes having automatic cross-coupling capability, and wherein the computer system determines that non-terminating paths extend between two nodes having automatic cross-coupling capability and determines that terminating nodes extend between one node having automatic cross-coupling capability and another node which does not have automatic cross coupling capability.

17. In a telecommunication network having a plurality of nodes interconnected by a plurality of communication paths, each path having one or more trunks traversing two or more nodes, a method for isolating failures within the network comprising the steps of:

receiving a plurality of alarms from selected nodes in the network, each of the alarms indicating a failure impacting one or more paths within the network;

identifying one or more paths producing alarms related to the failure;

retrieving data corresponding to a correlation of path identifiers of the plurality of paths in the network to maximum restoration spans for hypothetical failures along the plurality of paths, each path identifier corresponding to a physically distinct path in the network;

comparing the retrieved data to the identified paths; and identifying at least one failed restoration span based on the step of comparing the retrieved data to the identified paths, the failed restoration span including therealong the one or more paths which are producing the alarms, and wherein no other paths in the network produce alarms related to the failure.

18. The method of claim 17 wherein ports at nodes in the network produce alarms, and wherein the method further comprises the steps of:

identifying all ports for paths which include the one or more paths producing alarms related to the failure;

collecting all alarms issued from all alarming ports in the network in response to the failure;

determining if the all alarming ports in the network equal the identified ports;

declaring a full outage of the network if the all alarming ports in the network equal the identified ports; and declaring a partial outage of the network if the all alarming ports in the network is less than the identified ports.

19. The method of claim 17, further comprising the steps of:

determining that the failure exists within one of at least two restoration spans;

identifying pairs of intercoupled nodes for each restoration span;

determining a pair of nodes from which a pair of alarms are received, wherein the pair of alarms are selected from the set of alarms and have directions directed toward each other; and isolating the failure in the network as a failure link positioned between the determined pair of nodes.

20. The method of claim 17 wherein the step of receiving a plurality of alarms from selected nodes in the network includes receiving alarms which include data corresponding to the selected nodes, and ports at the selected nodes, traversed by the one or more impacted paths, and one or more path identifiers corresponding to the one or more impacted paths.

21. The method of claim 17 wherein the step of receiving a plurality of alarms from selected nodes in the network includes receiving alarms for only nodes having digital cross-connect equipment coupled to the one or more paths.

22. The method of claim 17, further comprising the step of implementing a network restoration plan based on the identified failed restoration span, wherein the restoration plan includes rerouting instructions for the network to compensate for the failure.

23. In a network having a plurality of nodes interconnected by a plurality of communication paths, each path having one or more channels traversing two or more nodes, a computer implemented method for isolating a failure within the network, the failure causing a plurality of alarms to be generated from selected nodes, the method comprising the steps of:

identifying one or more paths associated with alarms related to the failure;

comparing the one or more identified paths to data of path identifiers of the plurality of paths in the network correlated with restoration spans for failures along the plurality of paths, each path identifier corresponding to a physically distinct path in the network;

identifying at least one restoration span based on the step of comparing the identified paths to the data, the restoration span including therealong the one or more paths producing alarms, and wherein no other paths in the network produce alarms related to the failure; and outputting data corresponding to the identified at least one restoration span.

24. The method of claim 23, further comprising the steps of selecting a group of alarms from the plurality of alarms, and determining directions of the group of alarms toward the failure.

25. The method of claim 23 wherein ports at nodes in the network produce alarms, and wherein the method further comprises the steps of:

identifying all ports for paths which include the one or more paths producing alarms related to the failure;

collecting all alarms issued from all alarming ports in the network in response to the failure;

determining if the all alarming ports in the network equal the identified ports;

declaring a full outage of the network if the all alarming ports in the network equal the identified ports; and declaring a partial outage of the network if the all alarming ports in the network is less than the identified ports.

26. The method of claim 23, further comprising the steps of:

determining that the failure exists within one of at least two restoration spans;

identifying pairs of intercoupled nodes for each restoration span;

determining a pair of nodes from which a pair of alarms are received, wherein the pair of alarms are selected from the set of alarms and have directions directed toward each other; and isolating the failure in the network as a failure link positioned between the determined pair of nodes.

27. The method of claim 23, further comprising the step of receiving a plurality of alarms from selected nodes in the network including receiving alarms for only nodes having automatic cross-coupling capability.

28. The method of claim 23, further comprising the step of implementing a network restoration plan based on the identified restoration span, wherein the restoration plan includes rerouting instructions for the network to compensate for the failure.

29. In a network having a plurality of communication paths coupling a plurality of nodes, each path having one or more channels traversing two or more nodes, an apparatus for isolating a failure within the network, the failure causing a plurality of alarms to be issued, the apparatus comprising:

a storage device having stored therein network data of path identifiers of paths in the network correlated with restoration spans for failures along the plurality of paths, each path identifier corresponding to a physically distinct path in the network; and a computer system coupled to the storage device and coupled to receive the plurality of alarms, the computer system (a) identifies one or more paths associated with alarms related to the failure, (b) compares the one or more identified paths to the stored data, and (c) identifies at least one restoration span, the restoration span including therealong the one or more paths producing alarms, and wherein no other paths in the network produce alarms related to the failure.

30. The apparatus of claim 29 wherein ports at nodes in the network produce alarms, and wherein the computer system (a) identifies all ports for paths including the one or more paths producing alarms related to the failure, (b) collects all alarms issued from all alarming ports in the network in response to the failure, (c) determines if the all alarming ports in the network equal the identified ports, (d) declares a full outage of the network if the all alarming ports in the network equal the identified ports, and (e) declares a partial outage of the network if the all alarming ports in the network do not equal the identified ports.

31. The apparatus of claim 29 wherein the computer system receives alarms for only nodes having digital cross-connect equipment.

32. The apparatus of claim 29 wherein the computer system implements a network restoration plan based on the identified failed restoration span, and wherein the restoration plan includes rerouting instructions for the network to compensate for the failure.

* * * * *